(12) United States Patent
Lin et al.

(10) Patent No.: US 11,580,666 B2
(45) Date of Patent: Feb. 14, 2023

(54) LOCALIZATION AND MAPPING METHOD AND MOVING APPARATUS

(71) Applicant: Automotive Research & Testing Center, Changhua County (TW)

(72) Inventors: Hung-Pang Lin, Changhua County (TW); Cheng-Kai Wang, Changhua County (TW)

(73) Assignee: Automotive Research & Testing Center, Changhua County (TW)

(*) Notice: Subject to any disclaimer, the term of this patent is extended or adjusted under 35 U.S.C. 154(b) by 42 days.

(21) Appl. No.: 17/105,624

(22) Filed: Nov. 26, 2020

(65) Prior Publication Data

US 2022/0164982 A1 May 26, 2022

(51) Int. Cl.
| | |
|---|---|
| *G06V 20/56* | (2022.01) |
| *G06V 20/58* | (2022.01) |
| *G06F 16/58* | (2019.01) |
| *G06F 16/587* | (2019.01) |
| *G06T 7/73* | (2017.01) |
| *G01C 21/00* | (2006.01) |
| *G06F 16/29* | (2019.01) |
| *G06V 10/40* | (2022.01) |

(52) U.S. Cl.
CPC ............ *G06T 7/74* (2017.01); *G01C 21/3807* (2020.08); *G06F 16/29* (2019.01); *G06F 16/587* (2019.01); *G06F 16/5866* (2019.01); *G06T 2207/30252* (2013.01); *G06V 10/40* (2022.01); *G06V 20/56* (2022.01)

(58) Field of Classification Search
CPC ............ G06T 7/74; G06T 2207/30252; G06F 16/587; G06F 16/5866; G06F 16/29; G01C 21/3807; G06V 10/40; G06V 20/56

USPC .......................................................... 348/148
See application file for complete search history.

(56) References Cited

U.S. PATENT DOCUMENTS

| | | | |
|---|---|---|---|
| 9,915,951 B2* | 3/2018 | Mei .................. | G05D 1/0257 |
| 10,599,149 B2* | 3/2020 | Zhao .................. | G06V 20/13 |
| 10,909,392 B1* | 2/2021 | Chaudhuri .......... | G05D 1/0214 |
| 2019/0050668 A1* | 2/2019 | Cansizoglu .......... | G06K 9/6215 |
| 2019/0301873 A1* | 10/2019 | Prasser ................. | G01C 21/32 |
| 2019/0302801 A1* | 10/2019 | Zlot ..................... | G05D 1/0289 |
| 2020/0167993 A1* | 5/2020 | Chen .................... | G06V 10/751 |

(Continued)

FOREIGN PATENT DOCUMENTS

WO    WO-2018230852 A1 * 12/2018 .......... B25J 9/1666

*Primary Examiner* — Albert Kir

(74) *Attorney, Agent, or Firm* — CKC & Partners Co., LLC

(57) ABSTRACT

A localization and mapping method is for localizing and mapping a moving apparatus in a moving process. The localization and mapping method includes an image capturing step, a feature point extracting step, a flag object identifying step, and a localizing and mapping step. The image capturing step includes capturing an image frame at a time point of a plurality of time points in the moving process by a camera unit. The flag object identifying step includes identifying whether the image frame includes a flag object among a plurality of the feature points in accordance with a flag database. The flag database includes a plurality of dynamic objects, and the flag object is corresponding to one of the dynamic objects. The localizing and mapping step includes performing localization and mapping in accordance with the image frames captured and the flag object thereof in the moving process.

8 Claims, 10 Drawing Sheets

(56) References Cited

U.S. PATENT DOCUMENTS

2021/0201578 A1\* 7/2021 Chaudhuri .............. G06T 7/246
2022/0198677 A1\* 6/2022 Bisain ..................... G06T 7/174
2022/0221304 A1\* 7/2022 Stellmann ............ G06Q 10/083

\* cited by examiner

490d

480f

480g

480h

480i

11,580,666 B2

LOCALIZATION AND MAPPING METHOD AND MOVING APPARATUS

BACKGROUND

Technical Field

The present disclosure relates to a localization and mapping method, and a moving apparatus. More particularly, the present disclosure relates to a visual localization and mapping method, and a moving apparatus applying the aforementioned localization and mapping method.

Description of Related Art

In recent years, with the increasing market demand of moving apparatuses such as autonomous vehicles, drones (unmanned aerial vehicle, UAV) and robots, there are more attentions and wide applications in VSLAM (Visual Simultaneous Localization and Mapping) technology. VSLAM is employed to capture surrounding images by an image sensor (i.e., a photographer, a camera, etc.) to obtain and recognize the surrounding terrain environment, further determine where it is, and thereby simultaneously localizing and mapping for a moving apparatus.

However, the localization and mapping are for an environment of a position, which contains dynamic objects or movable objects, at a time point. While returning to the same position at different time points, the localization and mapping may be unstable due to a new or disappeared dynamic object. Accordingly, there is an urgent need in the market for a visual localization and mapping method, and a moving apparatus applying the aforementioned localization and mapping method, which are beneficial to reduce the mapping misjudgments and localization errors caused by the above problems.

SUMMARY

According to one aspect of the present disclosure, a localization and mapping method is for localizing and mapping a moving apparatus in a moving process. The localization and mapping method includes an image capturing step, a feature point extracting step, a flag object identifying step, and a localizing and mapping step. The image capturing step includes capturing an image frame at a time point of a plurality of time points in the moving process by a camera unit. The feature point extracting step includes extracting a plurality of feature points from the image frame. The flag object identifying step includes identifying whether the image frame includes a flag object among the feature points in accordance with a flag database. The flag database includes a plurality of dynamic objects, and the flag object is corresponding to one of the dynamic objects. The localizing and mapping step includes performing localization and mapping in accordance with the image frames captured and the flag object thereof in the moving process.

According to another aspect of the present disclosure, a moving apparatus includes a camera unit, a processor and a memory. The processor is coupled to the camera unit. The memory is coupled to the processor and configured to provide a localization and mapping module, and a flag database. The flag database includes a plurality of dynamic objects. The processor in accordance with the localization and mapping module is configured to capture an image frame at a time point of a plurality of time points in a moving process by the camera unit, extract a plurality of feature points from the image frame, identify whether the image frame includes a flag object among the feature points in accordance with a flag database, and the flag object is corresponding to one of the dynamic objects of the flag database. The processor in accordance with the localization and mapping module is configured to further perform localization and mapping in accordance with the image frames captured and the flag object thereof in the moving process.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiments, the practical details is unnecessary. In addition, for simplifying the drawings, some conventional structures and elements will be simply illustrated, and repeated elements may be represented by the same labels.

Figure 1A:
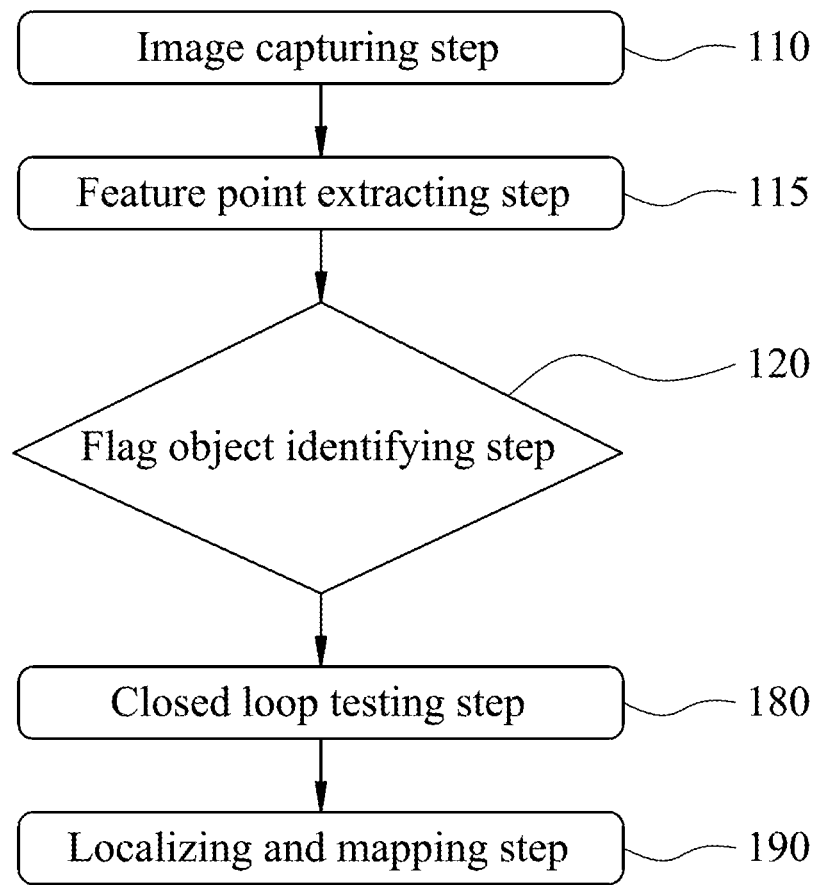
FIG. 1A is a flow chart of a localization and mapping method according to the 1st embodiment of the present disclosure.
Figure 2:
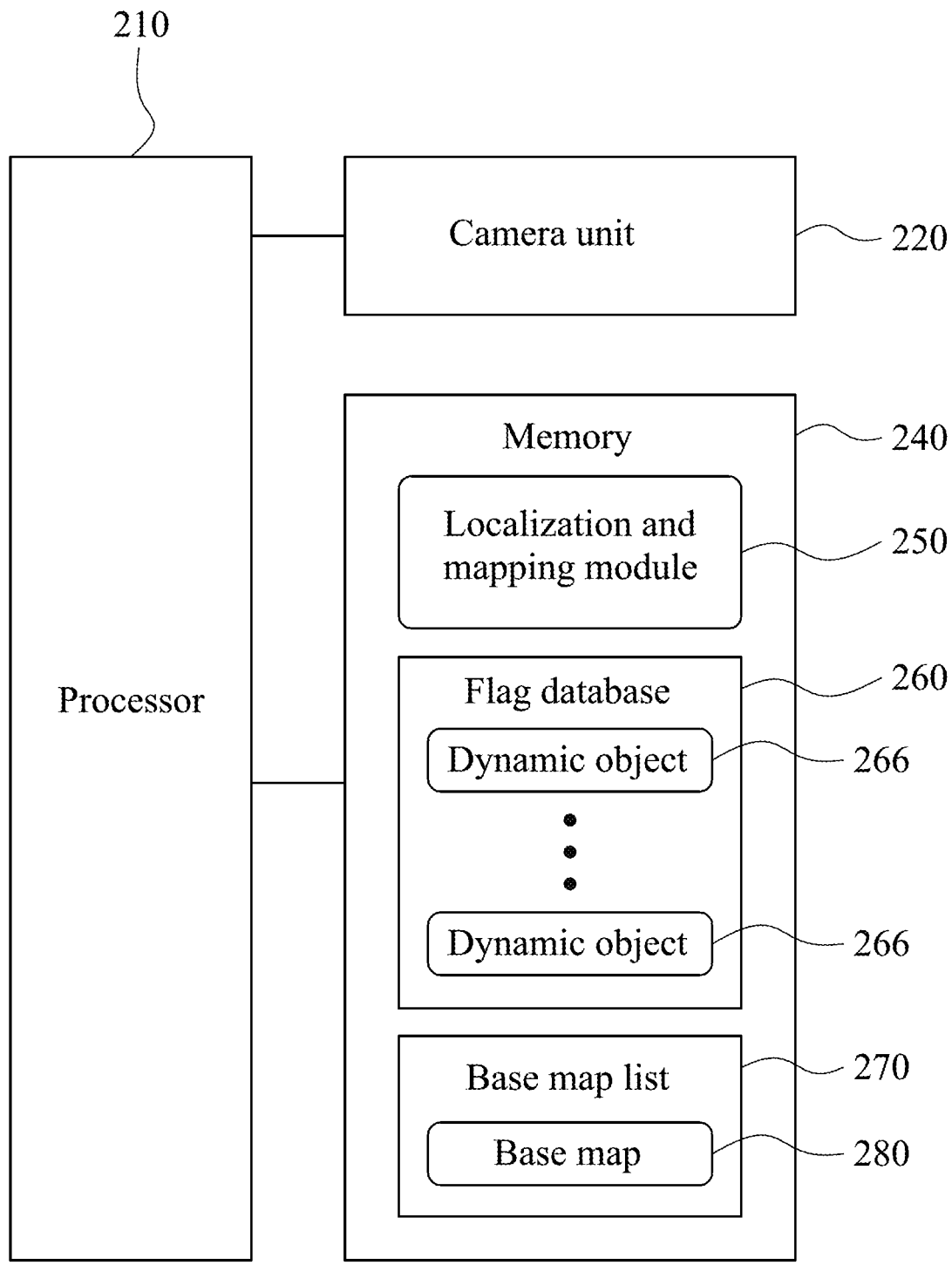
FIG. 2 is a block diagram of a moving apparatus according to the 2nd embodiment of the present disclosure.

FIG. 1A is a flow chart of a localization and mapping method 100 according to the 1st embodiment of the present disclosure. FIG. 2 is a block diagram of a moving apparatus 200 according to the 2nd embodiment of the present disclosure. With reference to FIG. 1A and FIG. 2, the localization and mapping method 100 according to the 1st embodiment is described with an aid of the moving apparatus 200 according to the 2nd embodiment of the present disclosure. The localization and mapping method 100 is for localizing and mapping the moving apparatus 200 in a moving process. The localization and mapping method 100 includes an image capturing step 110, a feature point extracting step 115, a flag object identifying step 120, and a localizing and mapping step 190. Furthermore, the localization and mapping method 100 is provided for localizing and mapping to the moving apparatus 200 in the moving process or a moving path, and the moving path may be predetermined or determined by instantly controlling. The moving apparatus 200 may be an autonomous moving apparatus, or an apparatus of fully self-moving, semi-self-moving or assistive moving, e.g., an autonomous vehicle, an automated guided vehicle (AGV), a drone, a sweeping robot, etc. The localization and mapping method 100 may be a VSLAM method or a part of a VSLAM method employed by an autonomous moving apparatus.

Figure 1B:
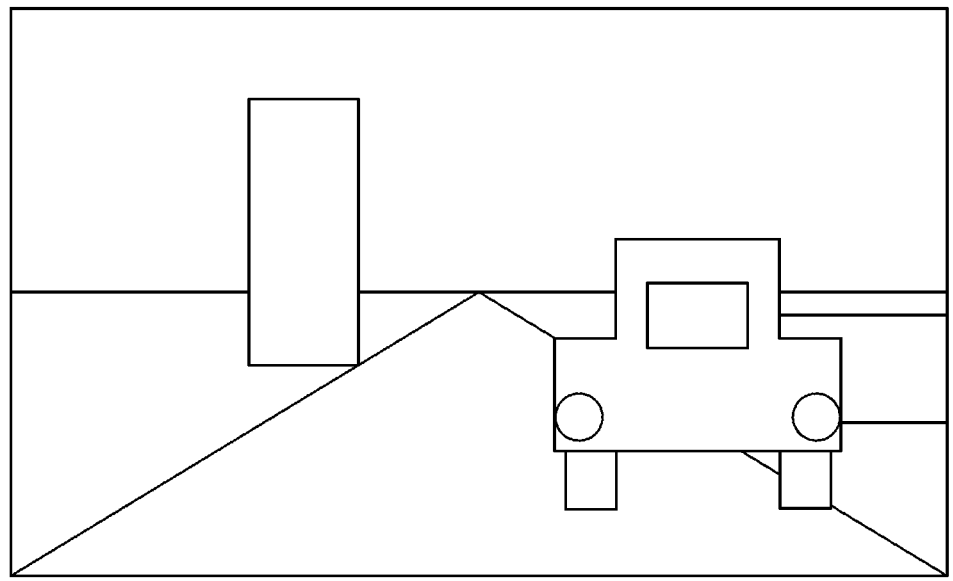
FIG. 1B is a schematic view of an image frame after performing an image capturing step in the 1st embodiment.

FIG. 1B is a schematic view of an image frame 290 after performing the image capturing step 110 in the 1st embodiment. With reference to FIG. 1A and FIG. 1B, the image capturing step 110 includes capturing the image frame 290 at a time point i of a plurality of time points i in the moving process by a camera unit 220.

Figure 1C:
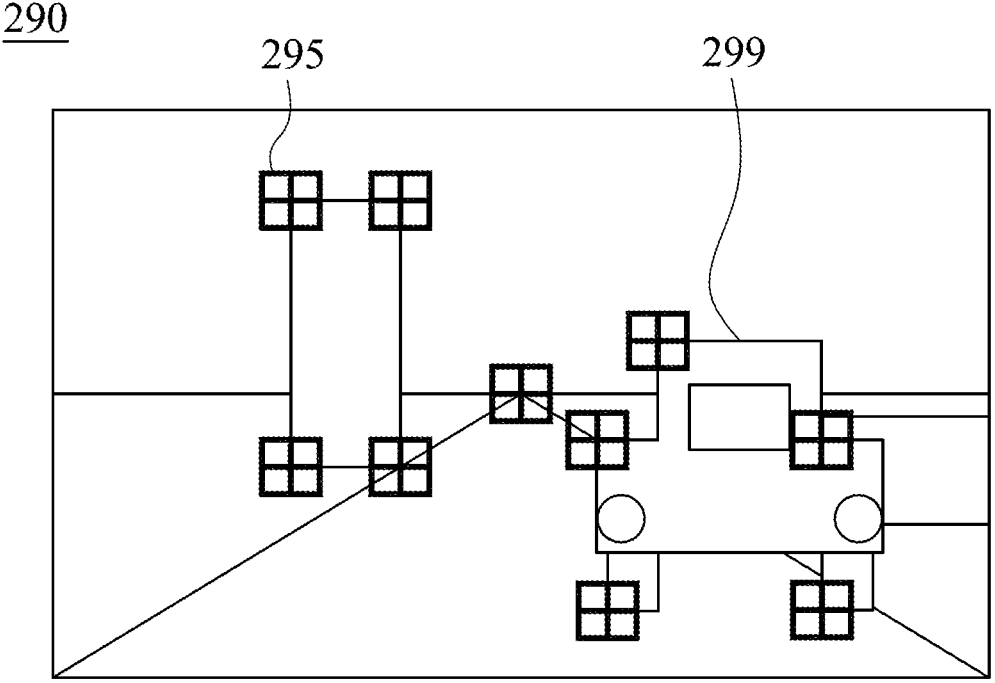
FIG. 1C is a schematic view of an image frame after performing a flag object identifying step in the 1st embodiment.

FIG. 1C is a schematic view of the image frame 290 after performing the flag object identifying step 120 in the 1st embodiment. With reference to FIG. 1A and FIG. 1C, the feature point extracting step 115 includes extracting a plurality of feature points (i.e., point cloud) 295 from the image frame 290. The flag object identifying step 120 includes identifying whether the image frame 290 includes a flag object among the feature points 295 in accordance with a flag database 260. The flag database 260 includes a plurality of dynamic objects 266. Each of the dynamic objects 266 is a predetermined non-static object or non-fixed object according to the surrounding environment in the moving process of the moving apparatus 200. The flag database 260 is a predetermined or updateable dataset including objects and features. Each of the flag objects is corresponding to one of the dynamic objects 266. For example, it is identified that the image frame 290 includes a flag object 299, and the flag object 299 is corresponding to one of the dynamic objects 266, as shown in FIG. 1C. Furthermore, convolutional neural networks (CNN) may be employed for the flag object identification in the feature point extracting step 115 and the flag object identifying step 120. That is, convolutional neural networks may be employed for being learned and trained with the dynamic objects 266 of the flag database 260.

The localizing and mapping step 190 includes performing localization and mapping in accordance with the image frames (one thereof is the image frame 290) captured and the flag object (e.g., the flag object 299) thereof in the moving process. Consequently, the camera unit 220 is employed in the localization and mapping method 100 according to the present disclosure, i.e., capturing surrounding images by an image sensor. The flag object identifying step 120 added to the VSLAM process is advantageous in filtering out a flag object being an unwanted information, which is deemed to one of the dynamic objects 266, i.e., filtering out an object temporarily appearing in the surrounding environment, so as to effectively reduce the localization errors and mapping misjudgments of VSLAM. In the 1st embodiment, the flag object identifying step 120 includes identifying whether the image frame 290 includes a flag object (e.g., the flag object 299) among the feature points 295 in accordance with the flag database 260, and thereby the localization and mapping method 100 may further include a step or a procedure of labeling, annotating, deleting, or comparing a plurality of base maps 280 (not limited thereto) in accordance with the flag object (e.g., the flag object 299) identified in the image frame 290 for performing localization and mapping. Specifically, the localization and mapping method 100 further includes a closed loop testing step 180, which includes optimizing the base maps 280, so as to perform the subsequent localizing and mapping step 190.

With reference to FIG. 2, the moving apparatus 200 according to the 2nd embodiment is described with an aid of the localization and mapping method 100 according to the 1st embodiment of the present disclosure. The moving apparatus 200 includes the camera unit 220, a processor 210 and a memory 240. The processor 210 is coupled (i.e., electrically or communicatively coupled) to the camera unit 220. The memory 240 is coupled to the processor 210 and configured to provide a localization and mapping module 250, and the flag database 260. The flag database 260 includes the plurality of dynamic objects 266. Specifically, the camera unit 220 is an image sensor and configured to capture at least one of a visible light image, an infrared light image and a depth image, but not limited thereto. The memory 240 is a non-transitory computer-readable memory, and the localization and mapping module 250 is software program codes, but not limited thereto. The memory 240 is configured to further provide a base map list (i.e., a base map database) 270, which includes the plurality of base maps 280. In addition, the moving apparatus 200 may be the autonomous moving apparatus, and the power-related units used for movement of the moving apparatus 200 are omitted in FIG. 2.

With reference to FIG. 1A, FIG. 1B and FIG. 2, the processor 210 in accordance with the localization and mapping module 250 is configured to capture the image frame 290 at the time point i of the plurality of time points i in the moving process by the camera unit 220, i.e., the image capturing step 110 of the localization and mapping method 100 is performed.

With reference to FIG. 1A, FIG. 1C and FIG. 2, the processor 210 in accordance with the localization and mapping module 250 is configured to extract the plurality of feature points 295 from the image frame 290, and identify whether the image frame 290 includes a flag object among the feature points 295 in accordance with the flag database 260. The flag object is corresponding to one of the dynamic objects 266 of the flag database 260. That is, the feature point extracting step 115 and the flag object identifying step 120 of the localization and mapping method 100 are performed. For example, it is identified that the image frame 290 includes the flag object 299, and the flag object 299 is corresponding to one of the dynamic objects 266, as shown in FIG. 1C. The processor 210 in accordance with the localization and mapping module 250 is configured to also perform localization and mapping in accordance with the image frames (one thereof is the image frame 290) captured and the flag object (e.g., the flag object 299) thereof in the moving process, i.e., the localizing and mapping step 190 of the localization and mapping method 100 is performed. Therefore, the moving apparatus 200 is beneficial to reduce the influences of the dynamic objects 266 on the VSLAM in the moving process or on the moving path, and thereby improve the localization stability.

Figure 3A:
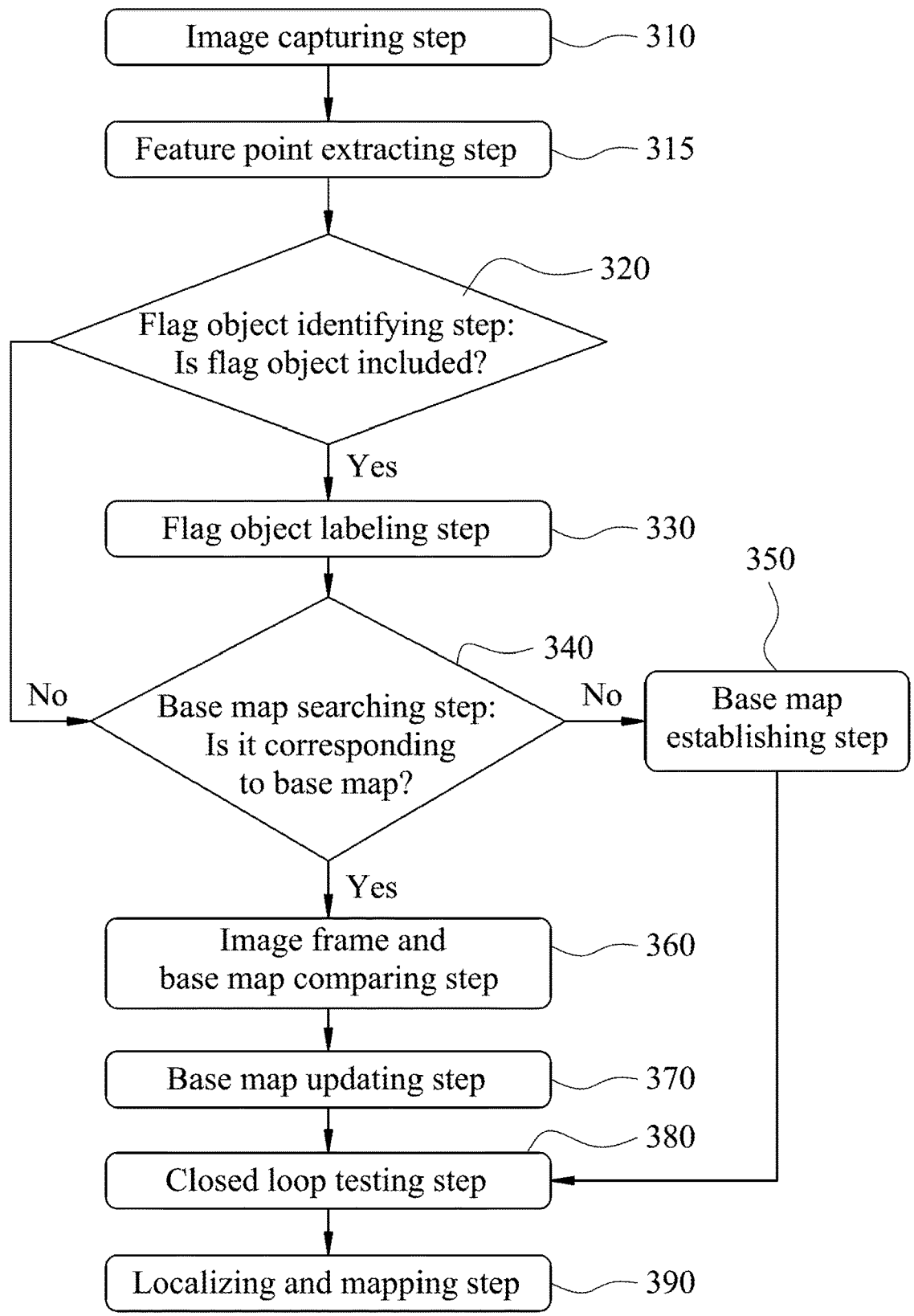
FIG. 3A is a flow chart of a localization and mapping method according to the 3rd embodiment of the present disclosure.
Figure 4A:
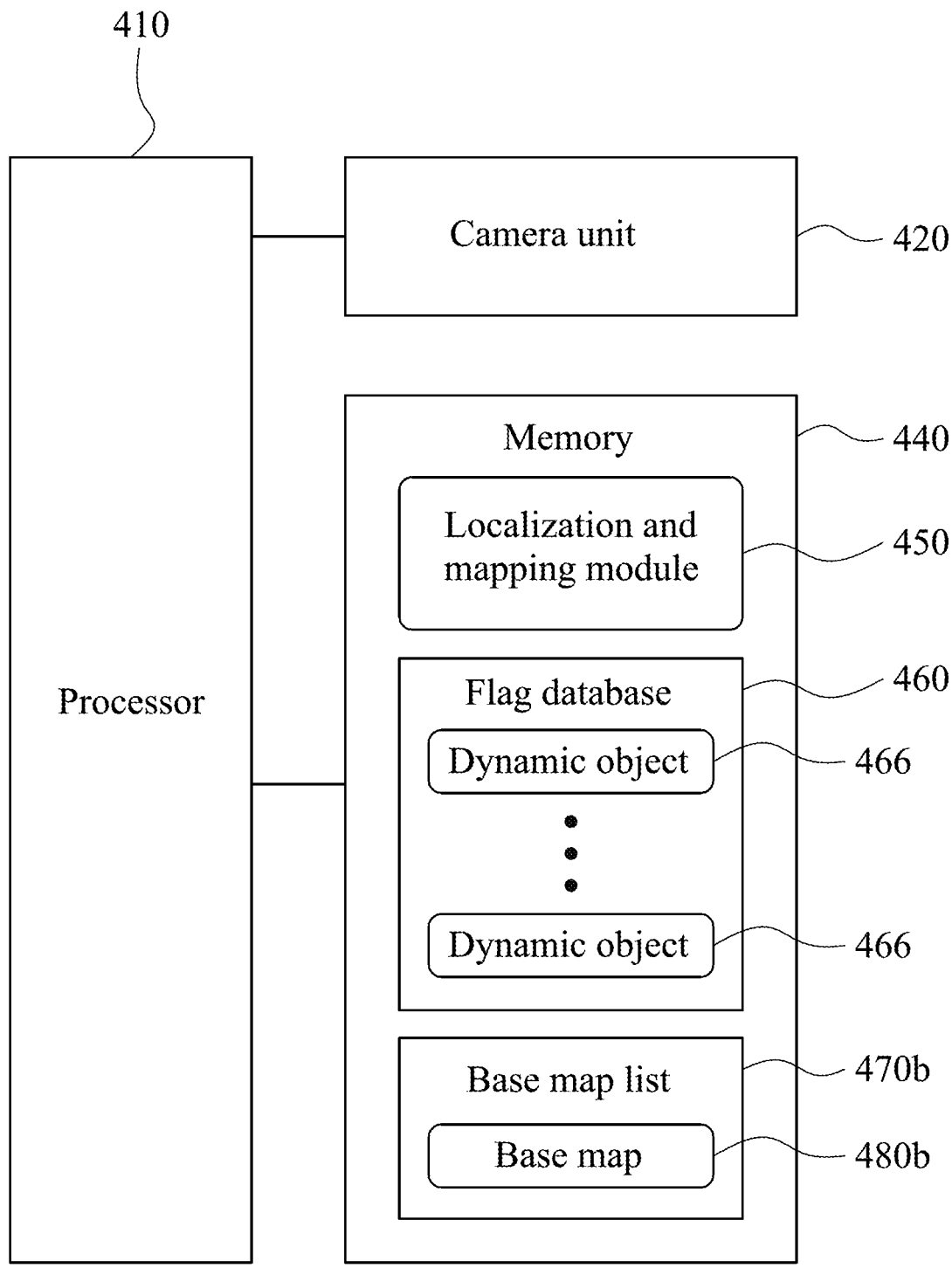
FIG. 4A is a block diagram of a moving apparatus according to the 4th embodiment of the present disclosure.

FIG. 3A is a flow chart of a localization and mapping method 300 according to the 3rd embodiment of the present disclosure. FIG. 4A is a block diagram of a moving apparatus 400 according to the 4th embodiment of the present disclosure. With reference to FIG. 3A and FIG. 4A, the localization and mapping method 300 according to the 3rd embodiment is described with an aid of the moving apparatus 400 according to the 4th embodiment of the present disclosure. The localization and mapping method 300 is for localizing and mapping the moving apparatus 400 in a moving process. The localization and mapping method 300 includes an image capturing step 310, a feature point extracting step 315, a flag object identifying step 320, and a localizing and mapping step 390.

Figure 3B:
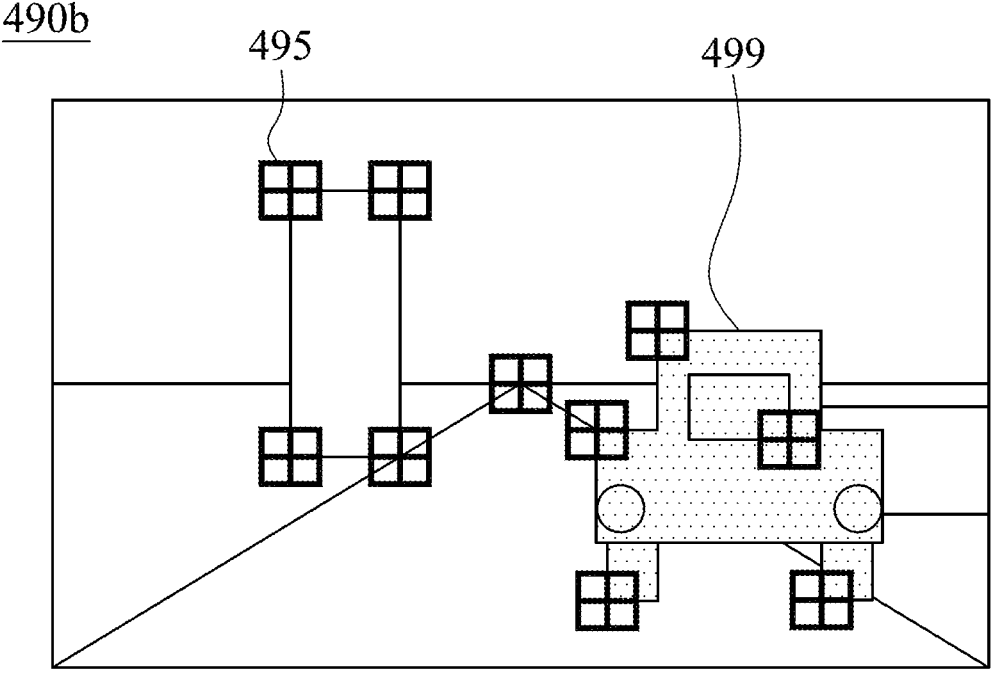
FIG. 3B is a schematic view of an image frame after performing a flag object labeling step in the 3rd embodiment.
Figure 4B:
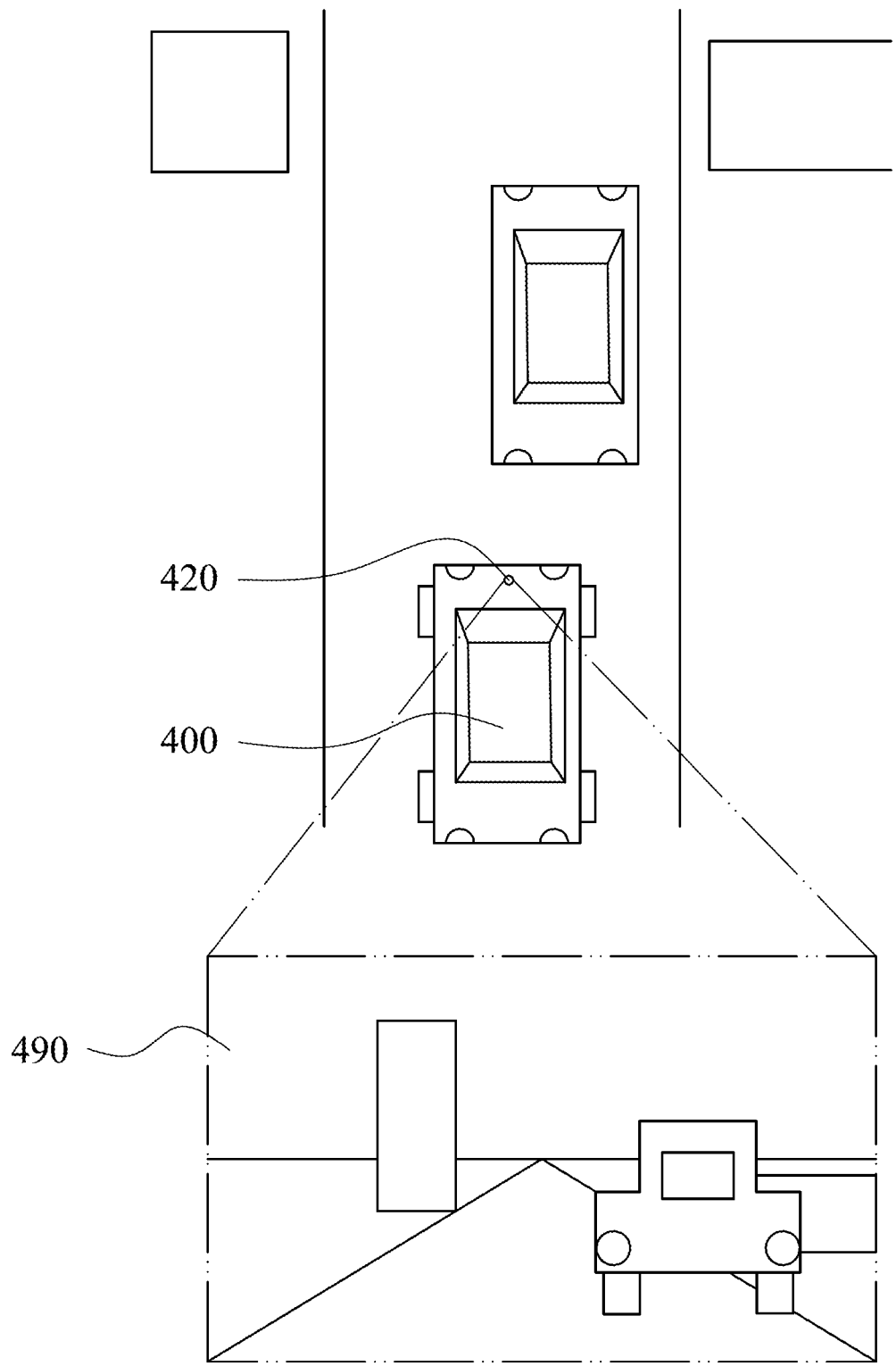
FIG. 4B is a schematic view of the moving apparatus in the 4th embodiment.

FIG. 3B is a schematic view of an image frame 490b after performing a flag object labeling step 330 in the 3rd embodiment. FIG. 4B is a schematic view of the moving apparatus 400 in the 4th embodiment. With reference to FIG. 3A, FIG. 3B, FIG. 4A and FIG. 4B, the image capturing step 310 includes capturing an image frame 490 at a time point i of a plurality of time points i in the moving process by a camera unit 420. The feature point extracting step 315 includes extracting a plurality of feature points 495 from the image frame 490. The flag object identifying step 320 includes identifying whether the image frame 490 includes a flag object (e.g., a flag object 499) among the feature points 495 in accordance with a flag database 460. The flag database 460 includes a plurality of dynamic objects 466, and each of the flag objects is corresponding to one of the dynamic objects 466. Specifically, each of the dynamic objects 466 is a predetermined non-static object or non-fixed object according to the surrounding environment in the moving process of the moving apparatus 400. The flag database 460 is a predetermined or updateable dataset including objects and features. It is employed to integrate object recognition and feature data to establish a flag dataset to be attached to a map database (i.e., a base map list 470b with labels or annotations of flag objects) so as to improve the extraction of VSLAM features. The data structure of each of the dynamic objects 466 includes a number, a type, a location, etc. of the dynamic object 466. Each of the dynamic objects 466 may include a predetermined or updateable parameterized structure of overlap filtering, filtering size, weight allocation, etc.

The localizing and mapping step 390 includes performing localization and mapping in accordance with the image frames (one thereof is the image frame 490) captured and the flag object (e.g., the flag object 499) thereof in the moving process. Specifically, the localization and mapping method 300 further includes a closed loop testing step 380, so as to perform the subsequent localizing and mapping step 390.

In detail, with reference to FIG. 3A, FIG. 4A and FIG. 4B, the moving apparatus 400 is a vehicle. The dynamic objects 466 of the flag database 460 include at least one of a pedestrian and a vehicle. Each of the dynamic objects 466 is a predetermined non-static object or non-fixed object according to the surrounding environment in the moving process of the moving apparatus 400. Accordingly, the localization and mapping method 300 is advantageous in localizing and mapping the moving apparatus 400 moving in a large field. Specifically, the localization and mapping method 300 is provided for localizing and mapping to the moving apparatus 400 in the moving process. The moving apparatus 400 may be an autonomous vehicle. The localization and mapping method 300 may be a VSLAM method or a part of a VSLAM method employed by the autonomous vehicle. The localization and mapping method 300 may also be combined with other localization methods, such as the Global Positioning System (GPS), the base station positioning technology of the mobile communication system, etc. to locate and map the moving apparatus 400. For example, it is identified that the image frame 490 includes the flag object 499, and the flag object 499 is corresponding to a vehicle of the dynamic objects 466.

With reference to FIG. 3A and FIG. 3B, FIG. 3B is the schematic view of the image frame 490b after performing the flag object labeling step 330 in the 3rd embodiment. The localization and mapping method 300 further includes the flag object labeling step 330. The flag object labeling step 330 includes adding a label (or an annotation) of a flag object (e.g., the flag object 499) to the image frame 490 when the image frame 490 includes the flag object, and the image frame 490 becomes the image frame 490b after being added with the label (or annotation) of the flag object. Therefore, the technique related to flag objects are effectively applied in localization and mapping. Furthermore, it should be understood that the image frame 490b shown in FIG. 3B is used to describe and interpret the present disclosure. The image frame 490b is actually in the form of data and may not be displayed by a display as shown in FIG. 3B. The same applies to FIG. 1B, FIG. 1C, and FIG. 3C to FIG. 3I of the present disclosure. Adding the label of the flag object 499 to the image frame 490 to be the image frame 490b indicates the processing and storage of the data of the image frame 490b, and it may not indicate that the flag object 499 labelled or annotated is displayed on the display in a specific manner.

Figure 3C:
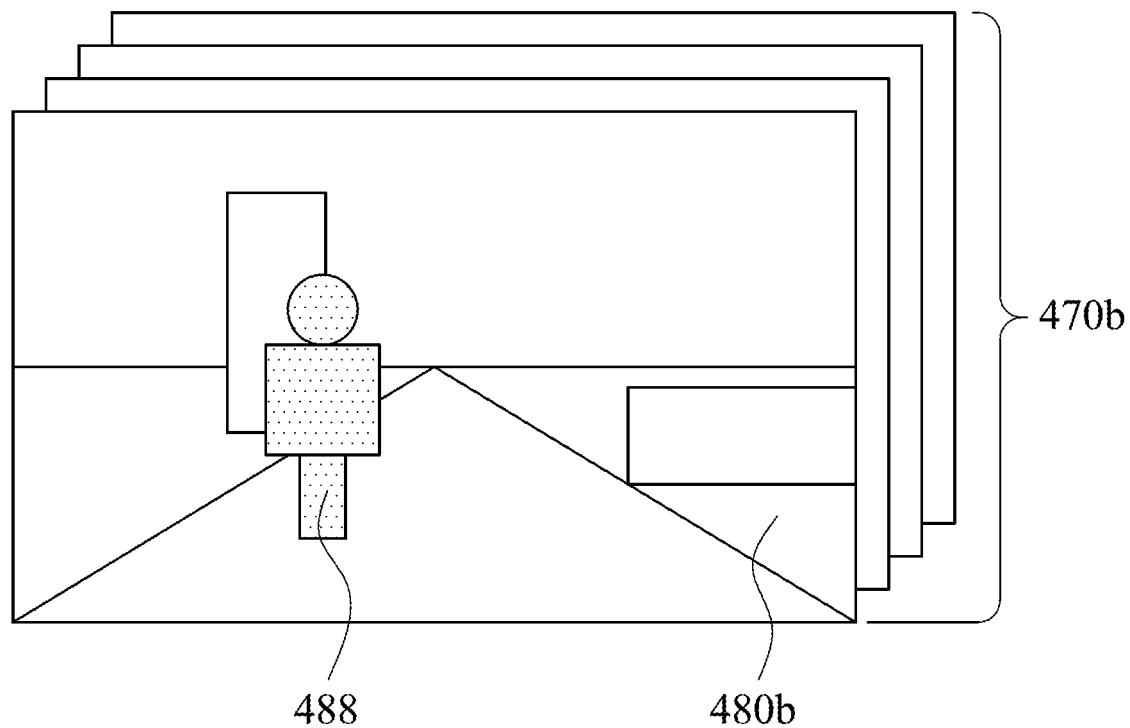
FIG. 3C is a schematic view of a base map list in the 3rd embodiment.

FIG. 3C is a schematic view of the base map list 470b in the 3rd embodiment. With reference to FIG. 3A to FIG. 3C and FIG. 4B, the localization and mapping method 300 further includes a base map searching step 340, which includes searching or looking up the base map list 470b. The base map list 470b is established (or added) and updated along with the moving process of the moving apparatus 400. When the image frame 490 includes a flag object (e.g., the flag object 499), after the flag object labeling step 330, it is verified whether the image frame 490b is corresponding to a base map of the base map list 470b. That is, it is verified whether a base map is existed in the base map list 470b, and the base map is corresponding to (or matches) the image frame 490b (In the 3rd embodiment, the image frame 490b is corresponding to the base map 480b of the base map list 470b). The base map 480b may be regarded as being established at an earlier time point, which the moving apparatus 400 passed the location that the image frame 490b is generated, and the location at which the base map 480b is established and the location at which the image frame 490b is generated are deemed to be the same. When the image frame 490 does not include the flag object 499 and any other flag object, it may be directly verified whether the image frame 490 is corresponding to a base map of the base map list 470b. That is, it is directly verified whether a base map is existed in the base map list 470b, and the base map is corresponding to the image frame 490. Accordingly, performing the base map matching process in the base map searching step 340 is beneficial to enhance the localization accuracy and the mapping success. In addition, when the moving apparatus 400 in the beginning of the moving process, the base map list 470b may include zero base maps. In the base map searching step 340, it may be to search all base maps of the base map list 470b one by one, or to search a relevant part of base maps via an index of the base map list 470b. In the base map searching step 340, it may be to compare all the feature points and the labels of the flag objects thereof of a base map, or to compare a relevant part of the feature points and the labels of the flag objects thereof of a base map, for searching for a base map corresponding to the image frame 490b.

Figure 3D:
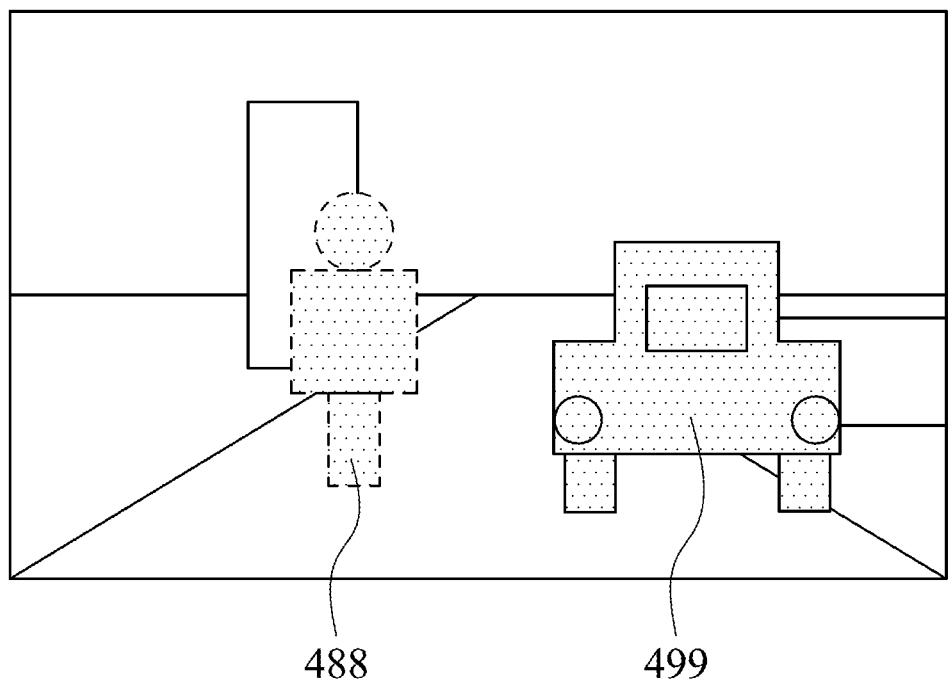
FIG. 3D is a schematic view of an image frame while performing a base map searching step in the 3rd embodiment.

FIG. 3D is a schematic view of an image frame 490d while performing the base map searching step 340 in the 3rd embodiment. With reference to FIG. 3A to FIG. 3D, in the base map searching step 340, it is to search all or a part of the base maps of the base map list 470b. When a base map of the base map list 470b includes a label of another flag object, the base map searching step 340 may include embedding the another flag object into a corresponding position of the image frame 490b, and verifying whether an image frame 490d embedded with the another flag object is corresponding to the base map of the base map list 470b. For example, as shown in FIG. 3C, when the base map 480b of the base map list 470b includes a label of a flag object 488, the base map searching step 340 may include embedding the flag object 488 into the corresponding position of the image frame 490b, which becomes the image frame 490d (as shown in FIG. 3D) after being embedded with the flag object 488, and verifying whether the image frame 490d embedded with the flag object 488 is corresponding to the base map 480b of the base map list 470b. Furthermore, the flag object 488 is corresponding to one of the dynamic objects 466, which is a pedestrian of the flag database 460.

Figure 3E:
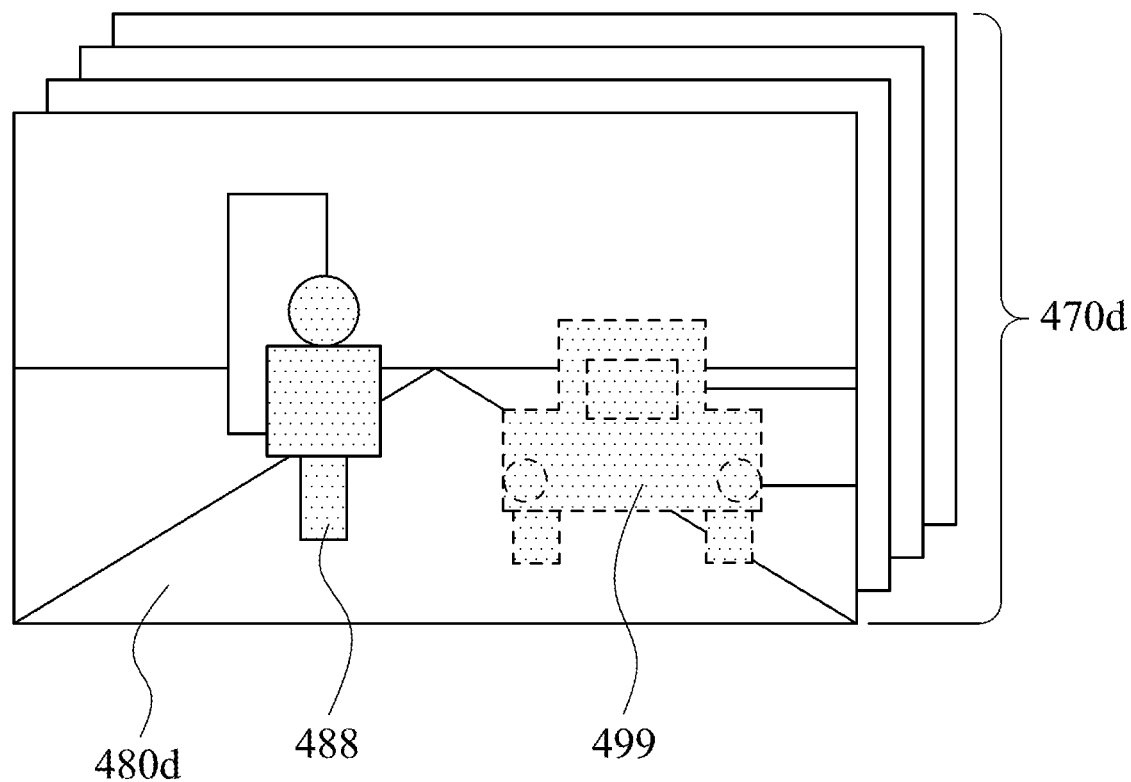
FIG. 3E is a schematic view of a base map list while performing the base map searching step in the 3rd embodiment.

FIG. 3E is a schematic view of a base map list 470d while performing the base map searching step 340 in the 3rd embodiment. With reference to FIG. 3A to FIG. 3C and FIG. 3E, in the base map searching step 340, it is to search all or a part of the base maps of the base map list 470b. When the image frame 490b includes the label of the flag object 499 (as shown in FIG. 3B), the base map searching step 340 may include embedding the flag object 499 into a corresponding position of each of the base maps being searched, which form a base map list 470d after being embedded with the flag object 499, and verifying whether the image frame 490b is corresponding to a base map embedded with the flag object 499 of the base map list 470d, as shown in FIG. 3E. For example, the base map searching step 340 may include embedding the flag object 499 into the corresponding position of the base map 480b, which becomes a base map 480d after being embedded with the flag object 499, and verifying whether the image frame 490b is corresponding to the base map 480d embedded with the flag object 499. Therefore, in practice, an image frame and a base map may include dozens, hundreds or even more of labels of flag objects, and the labels of the flag objects of the image frame and the base map may be partially the same. The localization and mapping method 300 according to the present disclosure is advantageous in cross-comparing a large number of flag object information to effectively search out the corresponding base map 480b, and perform the subsequent base map establishing or base map updating.

Figure 3F:
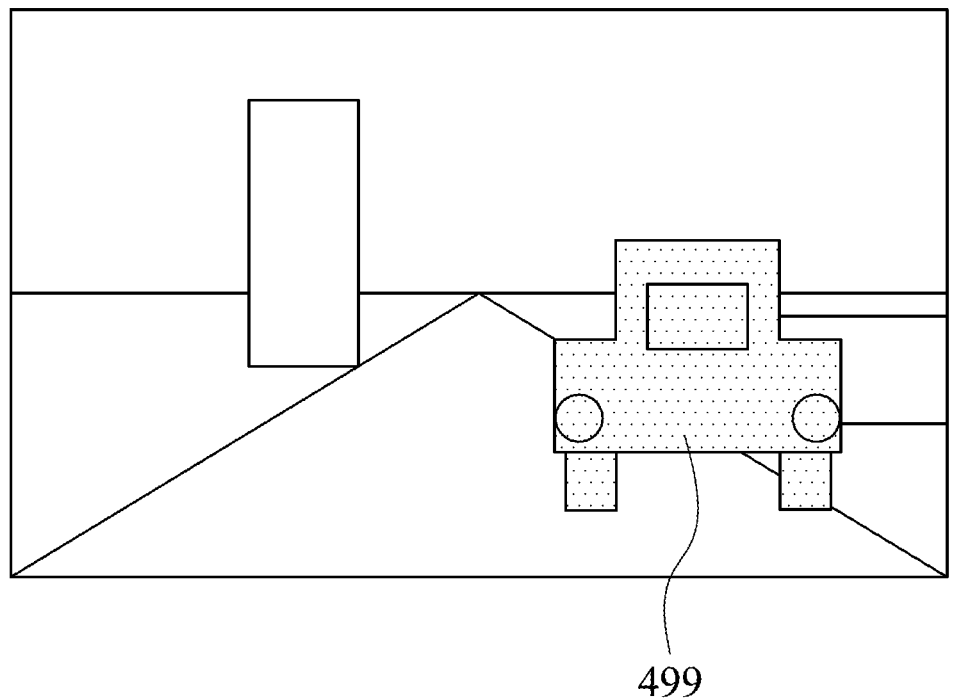
FIG. 3F is a schematic view of a base map after performing a base map establishing step in the 3rd embodiment.

FIG. 3F is a schematic view of a base map 480f after performing a base map establishing step 350 in the 3rd embodiment. With reference to FIG. 3A and FIG. 3F, the localization and mapping method 300 further includes the base map establishing step 350. When the image frame 490b is not corresponding to any base map of the base map list 470b (i.e., when the base map list 470b lacks a base map thereof to correspond to the image frame 490b), the base map establishing step 350 includes establishing and adding the base map 480f to the base map list 470b in accordance with the image frame 490b, and the base map 480f includes the label of the flag object 499. Accordingly, the base map 480f established may include information of a number, a type, a location, etc. of the flag object 499.

Figure 3G:
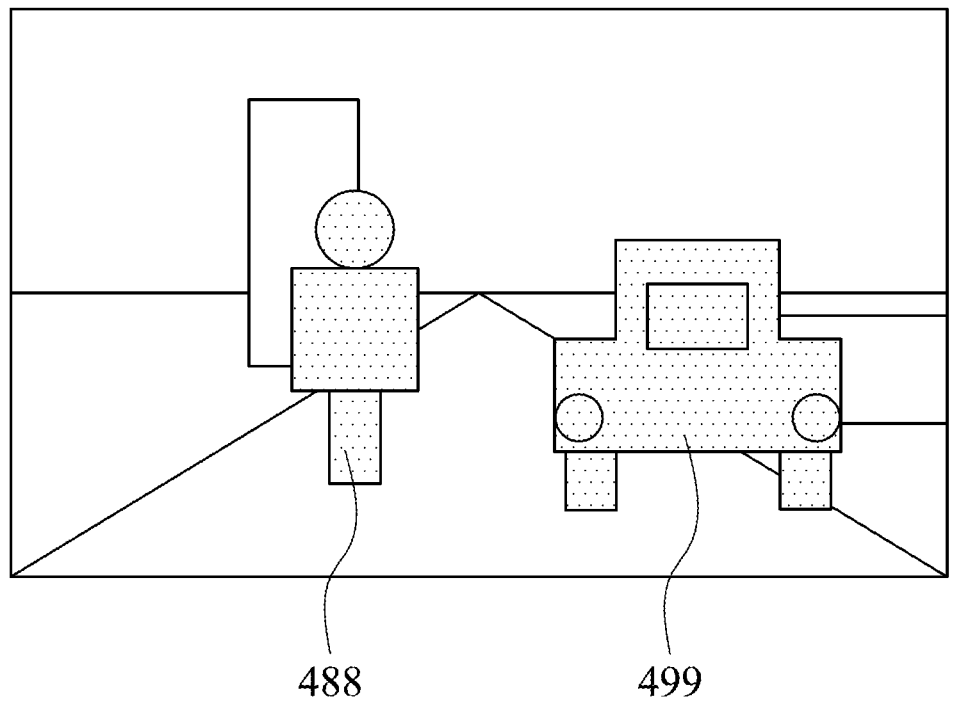
FIG. 3G is a schematic view of a base map after performing a base map updating step in the 3rd embodiment.

FIG. 3G is a schematic view of a base map 480g after performing a base map updating step 370 in the 3rd embodiment. With reference to FIG. 3A to FIG. 3C, FIG. 3F, FIG. 3G, and the following Equation (1) to Equation (3), after performing the image capturing step 310 and the feature point extracting step 315, $P_O$ represents the plurality of feature points 495 extracted from the image frame 490. When the flag object identifying step 320 is being performed, F represents a filter module in accordance with the flag database 460. The filter module may be a part of a localization and mapping module 450 for performing the flag object identifying step 320 and the flag object labeling step 330. The feature points 495 is filtered, screened or selected by the filter module to identify whether the feature points 495 of the image frame 490 include a flag object corresponding to one of the plurality of dynamic objects 466 of the flag database 460. After the flag object labeling step 330, $P_i$ represents the image frame 490b with a label of a flag object (e.g., the label of the flag object 499 in FIG. 4B), i.e., the image frame 490b filtered by the filter module, as shown in the following Equation (1).

After the base map establishing step 350, when the image frame 490b is not corresponding to any base map of the base map list 470b, i represents the time point, and a value thereof is defined to be 0. $MAP_i$ represents the base map 480f established and added to the base map list 470b in accordance with the image frame 490b at the time point i, as shown in the following Equation (2).

The localization and mapping method 300 further includes an image frame and base map comparing step 360, and the base map updating step 370. The image frame and base map comparing step 360 includes comparing the image frame 490b and the corresponding base map 480b when the image frame 490b is corresponding to the base map 480b of the base map list 470b. The base map updating step 370 may include updating the corresponding base map 480b in accordance with the following Equation (3) to be the base map 480g. In Equation (3), i represents the time point and a value thereof is defined to be greater than 0, i−1 represents a previous one time point based on the corresponding base map 480b, $MAP_i$ represents the updated corresponding base map 480g updated at the time point i, $MAP_{i-1}$ represents the corresponding base map 480b at the previous one time point i−1, and $P_i$ represents the image frame 490b with a label or labels of a flag object or flag objects (e.g., the label of the flag object 499 in FIG. 4B) at the time point i, i.e., the image frame 490b filtered by the filter module, as shown in the following Equation (3). The part of $(P_i \cap MAP_{i-1})$ of Equation (3) can be taken as a set of static objects or fixed objects, e.g., buildings, in the base map 480b. With reference to the aforementioned Equation (1) to Equation (3) as the following:

$$P_i = F(P_o) \quad \text{Equation (1);}$$

$$MAP_i = P_i, \text{ If } i=0 \quad \text{Equation (2); and}$$

$$MAP_i = MAP_{i-1} + [P_i - (P_i \cap MAP_{i-1})], \text{ If } i>0 \quad \text{Equation (3).}$$

Therefore, when the corresponding base map 480b includes the label of the flag object 488 and the image frame 490b does not include the label of the flag object 488, the corresponding base map 480b may be updated to be and become the base map 480g after the flag object 488 being remained therein and the flag object 499 being added thereto, as shown in FIG. 3G.

Figure 3H:
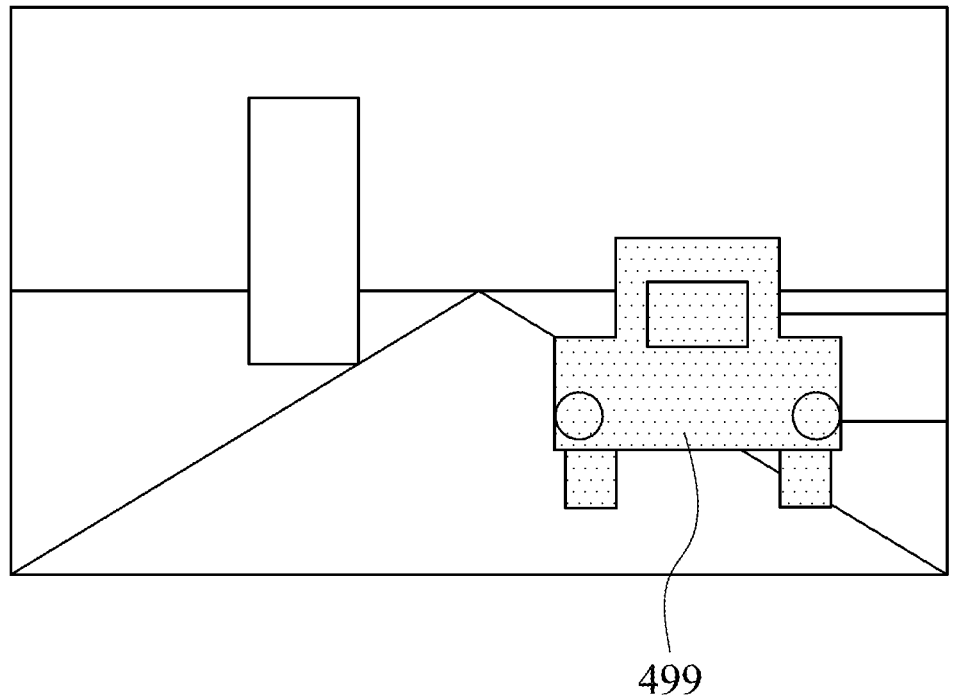
FIG. 3H is a schematic view of another base map after performing the base map updating step in the 3rd embodiment.

FIG. 3H is a schematic view of a base map 480h after performing the base map updating step 370 in the 3rd embodiment. With reference to FIG. 3A to FIG. 3C and FIG. 3H, the base map updating step 370 may include updating the corresponding base map 480b by removing the flag object 488, and the base map 480b becomes the base map 480h after the flag object 488 being removed therefrom, when the corresponding base map 480b includes the label of the flag object 488 and the image frame 490b does not include the label of the flag object 488. Therefore, when the corresponding base map 480b includes the label of the flag object 488 and the image frame 490b does not include the label of the flag object 488, the corresponding base map 480b may be updated to be and become the base map 480h after the flag object 488 being removed therefrom and the flag object 499 being added thereto, as shown in FIG. 3H.

Figure 3I:
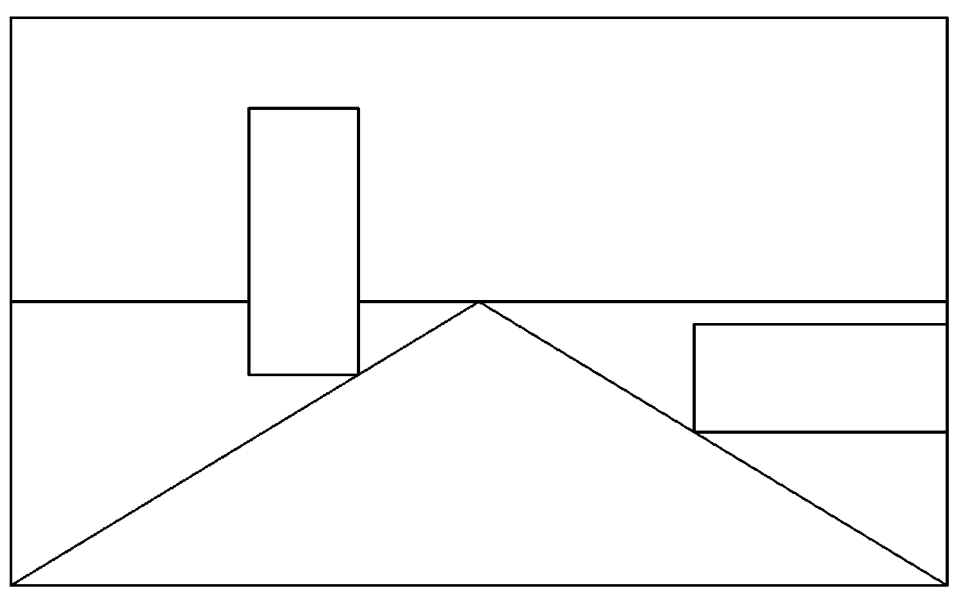
FIG. 3I is a schematic view of further another base map after performing the base map updating step in the 3rd embodiment.

FIG. 3I is a schematic view of a base map 480i after performing the base map updating step 370 in the 3rd embodiment. With reference to FIG. 3A and FIG. 3I, in the base map updating step 370, when the corresponding base map 480b includes the label of the flag object 488 and the image frame 490b does not include the label of the flag object 488, the corresponding base map 480b may be updated to be and become the base map 480i after the flag object 488 being removed therefrom and the flag object 499 being not added thereto, as shown in FIG. 3I.

Furthermore, the base map updating step 370 is a blocked object optimization step. That is, the image frame 490b and a flag object labeled thereof (e.g., the flag object 499) are used to be compared with the existing map information of the base map 480b in time domain and space domain for timely updating the base map 480b, so as to reduce the map reconstruction and online update the map information. For example, a label of a flag object in the base map according to the present disclosure may include a weight. A flag object that appears repeatedly during the moving process may have a higher remaining weight (i.e., a lower removal weight). The repeatedly appearing flag object may actually be a static object, e.g., an advertising pattern on a building that is very similar to a pedestrian. Thus, the repeatedly appearing flag object may be remained in the base map updating step 370, i.e., the base map updating manner of remaining the flag object 488, as shown in FIG. 3G, is employed. That is, the repeatedly appearing flag object may not be removed in the base map updating step 370, i.e., the base map updating manner of removing the flag object 488, as shown in FIG. 3H and FIG. 3I, is not employed. Specifically, the base map 480b stored at the first time at a location in the moving process of the moving apparatus 400 may include dozens, hundreds or even more flag objects. When a number of times that the moving apparatus 400 passes through the same location increases, the localization and mapping method 300 according to the present disclosure is advantageous in accurately removing more flag objects, and thereby establishing and updating a more accurate base map.

With reference to FIG. 4A and FIG. 4B, the moving apparatus 400 according to the 4th embodiment is described with an aid of the localization and mapping method 300 according to the 3rd embodiment of the present disclosure. The moving apparatus 400 includes the camera unit 420, a processor 410 and a memory 440. The processor 410 is coupled to the camera unit 420. The memory 440 is coupled to the processor 410 and configured to provide the localization and mapping module 450, and the flag database 460. The flag database 460 includes the plurality of dynamic objects 466. Specifically, the moving apparatus 400 may be the autonomous vehicle. A control unit responsible for performing the VSLAM method of the moving apparatus 400 may include the processor 410 and the memory 440, and the power-related units used for movement of the moving apparatus 400 are omitted in FIG. 4A.

With reference to FIG. 3A, FIG. 4A and FIG. 4B, the processor 410 in accordance with the localization and mapping module 450 is configured to capture the image frame 490 at the time point i of the plurality of time points i in the moving process by the camera unit 420. That is, the image capturing step 310 of the localization and mapping method 300 is performed.

With reference to FIG. 3A, FIG. 3B, FIG. 4A and FIG. 4B, the processor 410 in accordance with the localization and mapping module 450 is configured to extract the plurality of feature points 495 from the image frame 490, identify whether the image frame 490 includes a flag object (e.g., the flag object 499) among the feature points 495 in accordance with the flag database 460, the flag database 460 includes the plurality of dynamic objects 466, and the flag object is corresponding to one of the dynamic objects 466. The processor 410 in accordance with the localization and mapping module 450 is configured to further perform localization and mapping in accordance with the image frames (one thereof being the image frame 490) captured and the flag object thereof (e.g., the flag object 499) in the moving process. That is, the feature point extracting step 315, the flag object identifying step 320, and the localizing and mapping step 390 of the localization and mapping method 300 are performed.

With reference to FIG. 3A, FIG. 3B, FIG. 4A and FIG. 4B, the processor 410 in accordance with the localization and mapping module 450 is configured to further add a label of a flag object (e.g., the flag object 499) to the image frame 490 when the image frame 490 includes the flag object, and the image frame 490 becomes the image frame 490b after being added with the label of the flag object 499. That is, the flag object labeling step 330 of the localization and mapping method 300 is performed.

With reference to FIG. 3A, FIG. 3B, FIG. 3C and FIG. 4A, the memory 440 is configured to further provide the base map list 470b, and the processor 410 in accordance with the localization and mapping module 450 is configured to further search the base map list 470b to verify whether the image frame 490b is corresponding to a base map of the base map list 470b, i.e., verify whether a base map is existed in the base map list 470b, and the base map is corresponding to the image frame 490b (the image frame 490b is corresponding to the base map 480b of the base map list 470b in the 3rd embodiment). That is, the base map searching step 340 of the localization and mapping method 300 is performed. Furthermore, only the base map list 470b and the base map 480b thereof provided by the memory 440 are shown in FIG. 4A, and the base map list 470d and the base maps 480d, 480f, 480g, 480h, 480i, which are temporarily stored, established, or updated during the executing process of the processor 410 in accordance with the localization and mapping module 450, are omitted in FIG. 4A.

With reference to FIG. 3A, FIG. 3B, FIG. 3F, FIG. 4A and FIG. 4B, the processor 410 in accordance with the localization and mapping module 450 is configured to further establish and add the base map 480f to the base map list 470b in accordance with the image frame 490b when the image frame 490b is not corresponding to any base map of the base map list 470b, and the base map 480f includes the label of the flag object 499. That is, the base map establishing step 350 of the localization and mapping method 300 is performed.

The processor 410 in accordance with the localization and mapping module 450 is configured to further compare the image frame 490b and the corresponding base map 480b when image frame 490b is corresponding to the base map 480b of the base map list 470b. That is, the image frame and base map comparing step 360 of the localization and mapping method 300 is performed.

With reference to FIG. 3A, FIG. 3B, FIG. 3G, FIG. 3H, FIG. 3I and FIG. 4A, when the corresponding base map 480b includes the label of the flag object 488 and the image frame 490b does not include the label of the flag object 488, based on the respective weights or other labeling, annotating contents of the flag objects 488, 499, the corresponding base map 480b may be updated to be and become the base map 480g after the flag object 488 being remained therein and the flag object 499 being added thereto, as shown in FIG. 3G. Alternately, the corresponding base map 480b may be updated to be and become the base map 480h after the flag object 488 being removed therefrom and the flag object 499 being added thereto, as shown in FIG. 3H. Alternately, the corresponding base map 480b may be updated to be and become the base map 480i after the flag object 488 being removed therefrom and the flag object 499 being not added thereto, as shown in FIG. 3I. The contents in this paragraph are the base map updating step 370 of the localization and mapping method 300 being performed.

The contents related to the localization and mapping method 300 according to the 3rd embodiment may be referred for the other details of the moving apparatus 400 according to the 4th embodiment, which are thereby not described herein.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A localization and mapping method, for localizing and mapping a moving apparatus in a moving process, the localization and mapping method comprising:
    an image capturing step comprising capturing an image frame at a time point of a plurality of time points in the moving process by a camera unit;
    a feature point extracting step comprising extracting a plurality of feature points from the image frame;
    a flag object identifying step comprising identifying whether the image frame comprises a flag object among the feature points in accordance with a flag database, wherein the flag database comprises a plurality of dynamic objects, and the flag object is corresponding to one of the dynamic objects;
    a flag object labeling step comprising adding a label of the flag object to the image frame when the image frame comprises the flag object;
    a base map searching step comprising searching a base map list to verify whether a base map is existed in the base map list, wherein the image frame is corresponding to the base map thereof when a location at which the image frame is captured is determined to be the same as a location at which the base map was generated; wherein when the base map of the base map list comprises a label of another flag object and the image frame does not comprise the label of the another flag object, the base map searching step comprises embedding the another flag object into the image frame, and verifying whether the image frame embedded with the another flag object is corresponding to the base map; wherein when the image frame comprises the label of the flag object and the base map does not comprise the label of the flag object, the base map searching step comprises embedding the flag object into the base map, and verifying whether the image frame is corresponding to the base map embedded with the flag object;
    an image frame and base map comparing step comprising comparing the image frame and the corresponding base map when the image frame is corresponding to the base map of the base map list;
    a base map updating step comprising updating the corresponding base map by removing the another flag object, when the corresponding base map comprises the label of the another flag object and the image frame does not comprise the label of the another flag object; and
    a localizing and mapping step comprising performing localization and mapping in accordance with the image frames captured and the flag object thereof in the moving process.

2. The localization and mapping method of claim 1, wherein the moving apparatus is a vehicle, and the dynamic objects comprise at least one of a pedestrian and a vehicle.

3. The localization and mapping method of claim 1, further comprising:
    a base map establishing step comprising establishing and adding a base map to the base map list in accordance with the image frame when the image frame is not corresponding to any base map of the base map list.

4. The localization and mapping method of claim 1, wherein the base map updating step further comprises updating the corresponding base map in accordance with a following equation, wherein i represents the time point, i−1 represents a previous one time point based on the corresponding base map, $MAP_i$ represents an updated base map updated at the time point, and $P_i$ represents the image frame with the label of the flag object at the time point:

$$MAP_i = MAP_{i-1} + [P_i - (P_i \cap MAP_{i-1})].$$

5. A moving apparatus, comprising:
    a camera unit;
    a processor coupled to the camera unit; and
    a memory coupled to the processor and configured to provide a localization and mapping module, a flag database, and a base map list, wherein the flag database comprises a plurality of dynamic objects;
    wherein the processor in accordance with the localization and mapping module is configured to:
    capture an image frame at a time point of a plurality of time points in a moving process by the camera unit;
    extract a plurality of feature points from the image frame;
    identify whether the image frame comprises a flag object among the feature points in accordance with a flag database, wherein the flag object is corresponding to one of the dynamic objects of the flag database;
    add a label of the flag object to the image frame when the image frame comprises the flag object;

search the base map list to verify whether a base map is existed in the base map list, wherein the image frame is corresponding to the base map thereof when a location at which the image frame is captured is determined to be the same as a location at which the base map was generated; search the base map list by embedding another flag object into the image frame and verifying whether the image frame embedded with the another flag object is corresponding to the base map of the base map list, when the base map comprises a label of the another flag object and the image frame does not comprise the label of the another flag object; search the base map list by embedding the flag object into the base map of the base map list and verifying whether the image frame is corresponding to the base map embedded with the flag object, when the image frame comprises the label of the flag object and the base map does not comprise the label of the flag object;

compare the image frame and the corresponding base map when image frame is corresponding to the base map of the base map list;

update the corresponding base map by removing the another flag object, when the corresponding base map comprises the label of the another flag object and the image frame does not comprise the label of the another flag object; and perform localization and mapping in accordance with the image frames captured and the flag object thereof in the moving process.

6. The moving apparatus of claim 5, wherein the moving apparatus is a vehicle, and the dynamic objects comprise at least one of a pedestrian and a vehicle.

7. The moving apparatus of claim 5, wherein the processor in accordance with the localization and mapping module is configured to further:
establish and add a base map to the base map list in accordance with the image frame when the image frame is not corresponding to any base map of the base map list.

8. The moving apparatus of claim 5, wherein the processor in accordance with the localization and mapping module is configured to further:
update the corresponding base map in accordance with a following equation, wherein i represents the time point, i−1 represents a previous one time point based on the corresponding base map, $MAP_i$ represents an updated base map updated at the time point, and Pi represents the image frame comprising the label of the flag object at the time point:

$$MAP_i = MAP_{i-1} + [P_i - (P_i \cap MAP_{i-1})].$$

* * * * *